July 30, 1957 — C. P. LENT — 2,801,058
SAUCER-SHAPED AIRCRAFT
Filed Dec. 6, 1950 — 3 Sheets-Sheet 1
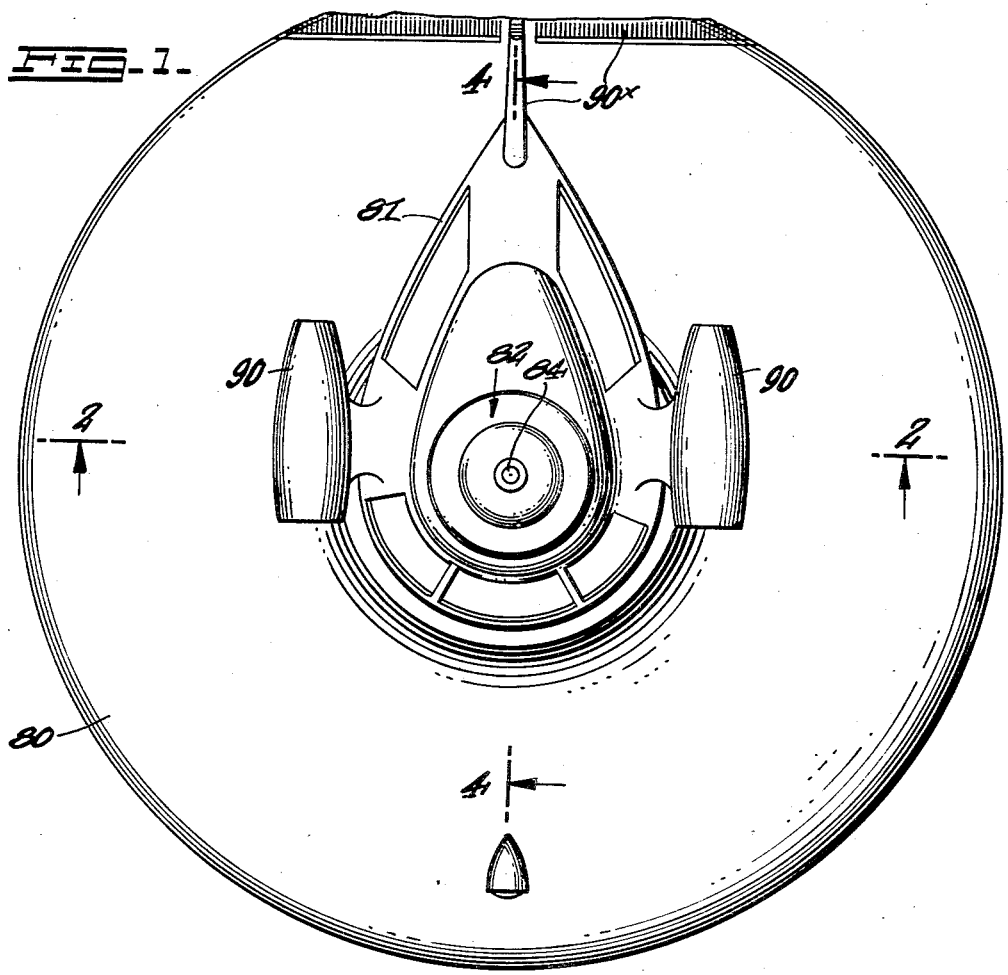
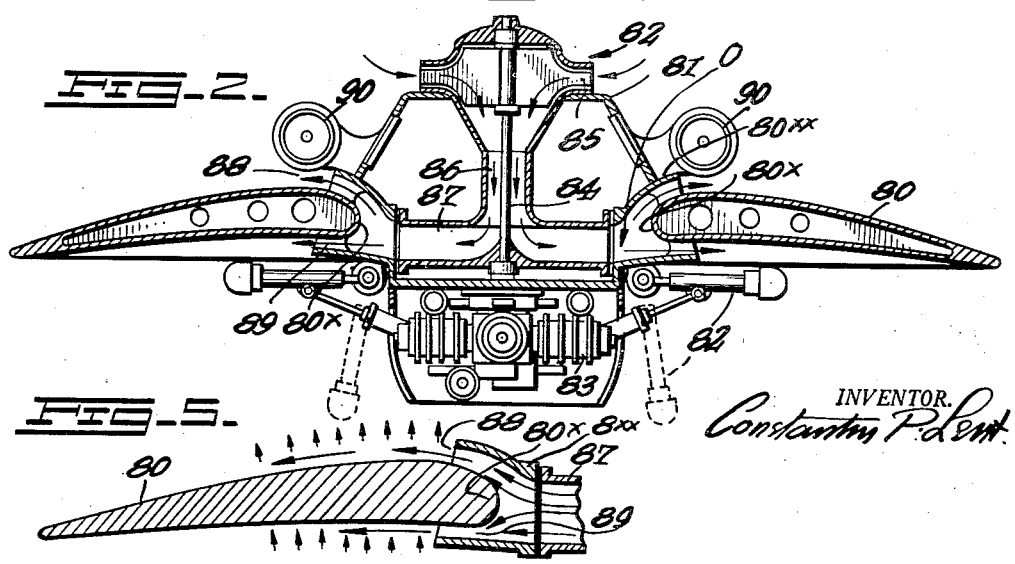
INVENTOR.
Constantin P. Lent

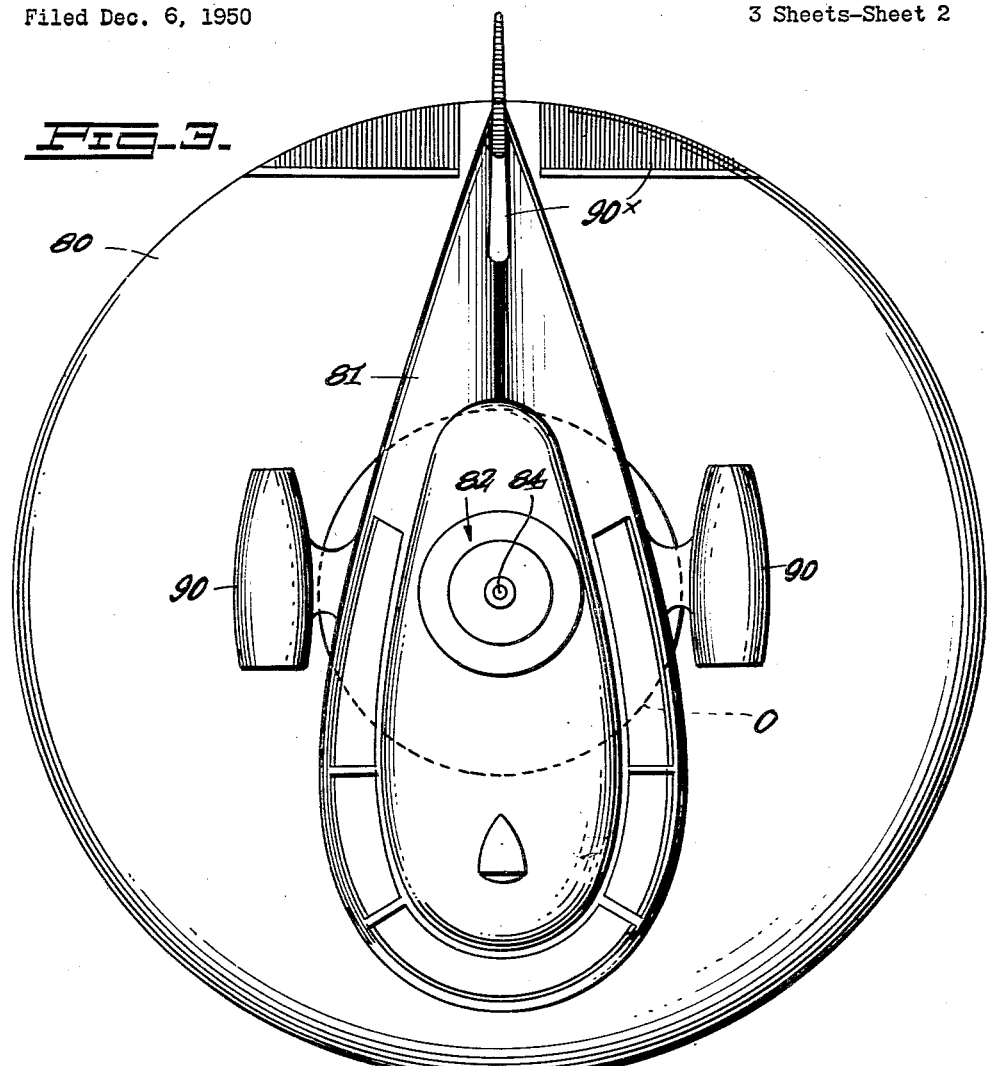
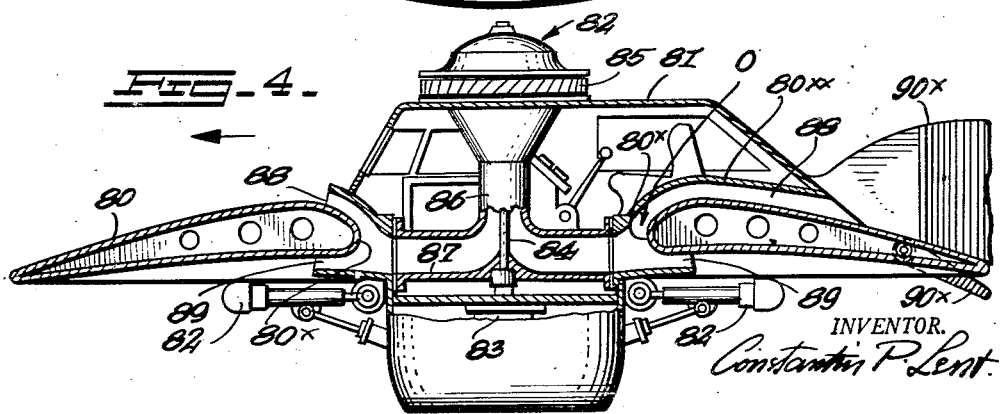
INVENTOR.
Constantin P. Lent

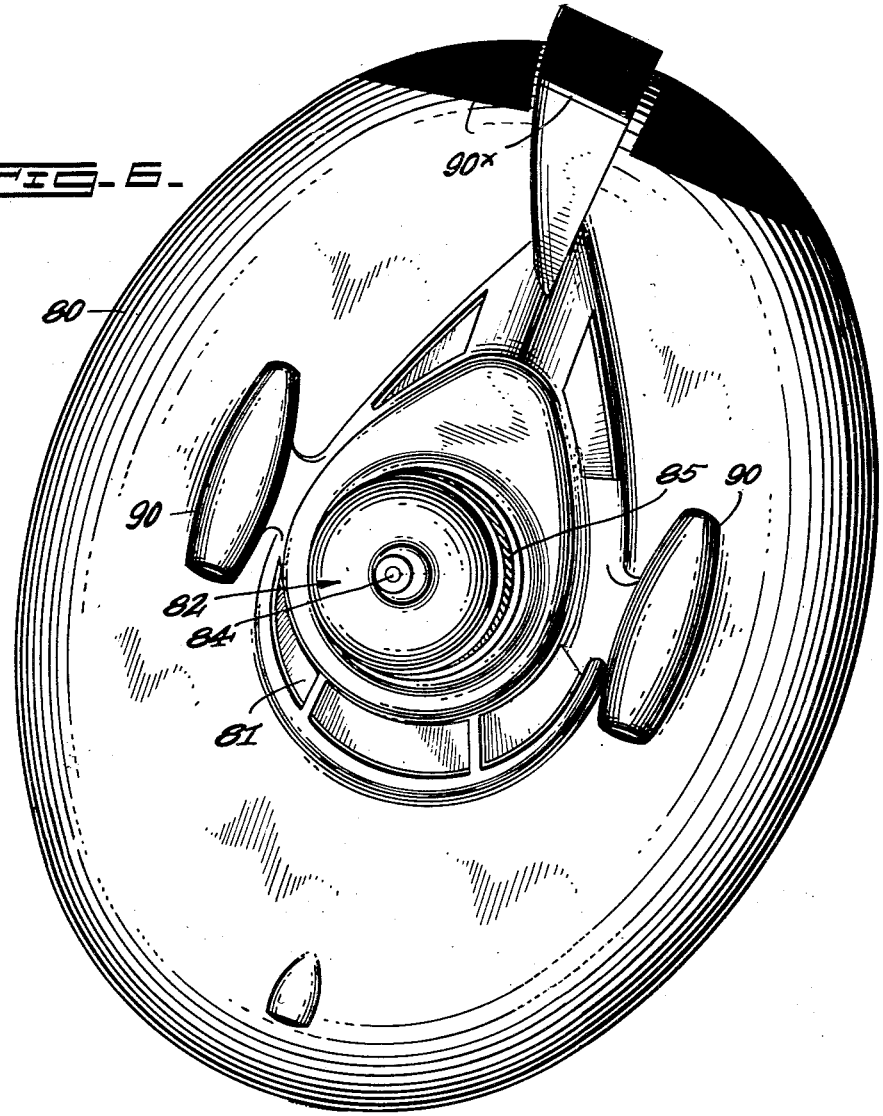

United States Patent Office 2,801,058
Patented July 30, 1957

2,801,058

SAUCER-SHAPED AIRCRAFT

Constantin P. Lent, New York, N. Y.

Application December 6, 1950, Serial No. 200,531

6 Claims. (Cl. 244—12)

This invention relates to saucer-shaped aircraft and more particularly to vehicles having a round or circular body contour known as "flying saucers."

The flying saucer described in this invention is not a thing in the realm of phantasy but a very practical aircraft obeying approved aerodynamic principles. Its mode of operation permits it to remain indefinitely in the air and as long as its prime-mover is supplied with fuel. It can hover over the ground at any height from 5 to 50,000 feet and more. It can move transversely under the control of a navigator and crew. It can carry passengers.

The saucer-shaped aircraft described in this invention can find utilization in commercial transportation such as air travel, transcontinental and transoceanic passenger service, commuter transport, mail transport and delivery and bus service for cities and towns. It is extremely useful for private plane operation.

The flying saucer described in this invention can attain tremendous speeds and its manuverability is enormous. It can rise vertically instantaneously and travel at supersonic speeds. But it can also fly at extremely low speeds and if necessary it can land and take off vertically at a passenger elevator speed or even less.

The flying saucer is safe and easy to operate. In case of motor failure, it will safely land by means of its circular wing the latter serving as a landing parachute.

Heretofore, heavier than air craft such as airplanes and helicopters relied upon the aerodynamic action of straight or slanted wings to produce the desirable lift. In the helicopter the aerodynamic action of the rotor blades being rotated through the air produce the lift.

In an airplane, the fuselage of the craft including its wings is propelled through the medium of the atmospheric air by means of the forward pull of propellers which are driven by reciprocating engines. In jet planes, forward pull is produced by the reaction of the gases in jet motors. In rocket driven planes, forward motion is produced by the reaction of the gases in its rocket motors. The well known aerodynamic action of the airfoil of the wing of the plane as it streams through the air creates a vacuum space above the wing and an air pressure space below it. The sum total of both, vacuum and air pressure, producing the vertical lift component which permits the wing and the fuselage of the plane to leave the ground. This is the principle that makes an airplane fly.

In a helicopter, the oversized rotor blades have an airfoil cross-section similar to the wing of the plane. As the blades of the rotor are rotated through the air by means of its motor, a vacuum space is created above the blades and an air pressure below; the sum total of both producing a vertical lift. This is the principle that makes a helicopter hover above ground. In the flying saucer craft described in this invention, the fuselage of the round-shaped body of the vehicle or circular wing is provided at the center portion thereof with air inlets or openings to permit a flow of air. The airflow in question passes from above the fuselage of the craft, under it. The flow of air is created by means of propellers or rotors driven by a prime-mover. The action of the air passing through the air inlet in the vehicle is twofold. First, the sucking action of the propeller or rotor lifts the craft aloft and second, the flow of air thus created is directed against the airfoil cross-section of the circular wing.

Generally speaking this invention provides a circular structure which is equipped with one or a plurality of openings passing through said structure and being fitted with a motive means for creating an air stream and directing it from above said structure below it. The stream thus created creating a vacuum over the top surface of the circular structure and air pressure under said structure. The resultant sum of vacuum and pressure creating a vertical lift and permitting the circular wing to hover or move anywhere under the direction of a navigator.

One object of this invention is to provide a circular wing for aircraft provided with motive means to create a vertical lift.

Another object of this invention is to provide a circular wing aircraft and motive means to create a vertical lift.

Still another object of this invention is to provide a circular wing aircraft provided with one single centrally located opening said circular wing aircraft resembling a doughnut-shaped fuselage.

Still another object of this invention is to provide motive means within the centrally located opening or openings in said round-shaped wing fuselage.

Still another object of this invention is to provide propeller means within the centrally located opening or openings in said round-shaped wing fuselage.

Still another object of this invention is to provide a round-shaped wing fuselage provided with rotor means within centrally located opening or openings in said round-shaped wing fuselage.

Another object of this invention is to provide an arrangement of wing structure and motive force to create a stream of air which being drawn from above said aircraft and its wing will be directed below it. This action producing a vertical lift.

Another object of this invention is to provide a doughnut-shaped craft having a circular wing of airfoil cross-section and means to pass a stream of air against said wing. The aerodynamic action of the air against said wing permitting the saucer and doughnut-shaped craft not only to rise vertically but also to hover over the same position indefinitely or move sideways or to any other direction under the control of a navigator and crew.

Still another object of this invention is to create a flow of air and direct it against the inside edge of a circular airfoil differentiating from a straight airfoil. The action of the air blown against the inside edge of the circular wing creating a vacuum space over the wing and an air pressure space under it thus making it possible for said wing to take off vertically.

A further object of this invention is to provide a fuselage of a round-shaped wing contour which will contain an air inlet or hole in its center, the round-shaped wing being stationary in relation to a set of rotating propellers or air rotors, the propellers or rotors being located adjacent to said air inlet, and the action of the propellers or rotors creating a stream of air through said inlet in the round-shaped wing.

Still another object of this invention is to provide double-acting propeller means within the openings in said round-shaped wing fuselage.

Still another object of this invention is to provide a circular wing structure and reciprocating engine means or electric motor means to operate propellers or rotors contained within an opening leading into said wing structure.

A still further object of this invention is to provide a round-shaped wing structure and air pump means located within openings leading through said round-shaped structure.

Still another object of this invention is to provide a round-shaped wing structure, holes passing through said structure, propeller or rotor means located within said holes, said holes being equipped with baffle plates to direct a stream of air entering said holes from above through the holes in said wing structure.

Still another object of this invention is to provide a round-shaped wing structure resembling a doughnut, a single hole passing in the center portion of said structure, propeller or air rotor means inside said hole. Said hole being provided with baffle plates to direct a stream of air entering said hole against the wall portion comprising said hole in said wing structure.

Still another object of this invention is to provide a round-shaped wing structure comprising an airfoil with a single opening in its center, said wing structure resembling a doughnut-shaped wing, having a propeller or air rotor means located within said opening, said round-shaped wing provided also with a baffle plate within said circular opening for directing the air entering said opening from above against the internal edge of said airfoil.

A still further object of this invention is to provide a circular wing structure, said structure in cross-section being similar to the cross-section of standard airplane wings, or airfoils.

A still further object of this invention is to provide a circular wing comprising a saucer-shaped structure, one or more openings in said structure, motive means in said structure to operate air rotors or propellers within said opening or openings.

A still further object of this invention is to provide a standard airfoil fuselage comprising a doughnut-shaped circular wing with a hole in its center, propellers or rotors within said opening and motivating means to operate said propellers or rotors.

A still further object of this invention is to provide a circular wing plane provided with openings which contain propellers or air rotors, and motive means to operate said propellers, said wing provided with directional control means such as rudder and ailerons.

A still further object of this invention is to provide a circular doughnut-shaped wing structure and means for landing and launching said structure.

A still further object of this invention is to provide a circular doughnut-shaped wing fuselage, landing and take-off means on said fuselage, said means comprising rubber tires or legs to absorb the shock of landing or launching said fuselage.

A still further object of this invention is to provide a circular wing plane equipped with an opening or openings, propeller or air rotor means in said openings, said propeller means being operated by motor means in said wing, and jet or propeller motive means upon said wing, said motor means within said openings facilitating vertical lift while said motive means on said wing facilitates transverse motion.

Further objects will be seen and become apparent as the specification of this invention will proceed.

Referring to figures:

Fig. 1 is a plan view of the flying saucer craft shown in Fig. 6.

Fig. 2 is a cross-section through the circular wing craft taken on the line 2—2 of Fig. 1.

Fig. 3 is a plan view of a circular flying saucer craft with the navigator cabin running transversely the entire width of the craft.

Fig. 4 is a cross-section on the line 4—4 of Fig. 1 showing the navigator cabin.

Fig. 5 is a cross-section through the inside edge of the circular airfoil-shaped wing showing the manner in which air is directed against it to create an aerodynamic vacuum on the top of the airfoil and an air pressure below it.

Fig. 6 is a perspective view of a preferred embodiment of the circular flying saucer craft.

Referring more particularly to Fig. 1, it is a plan view of a flying saucer aircraft of a more advanced design. Numeral 80 in the drawing designates the circular wing and 81 the navigator's cabin. A rotor or propeller means 82 is preferably located upon the top of the cabin 81 and is being operated by means of a reciprocating motor means 83, although any other power source can be used. The engine means 83 turns a vertical shaft 84 which is secured to the rotor ring of the rotor means 82. The rotor ring is designated by the numeral 85.

Referring to Fig. 2, the air from the rotor means 85 is directed through the vertical channel 86 to the horizontal circular air distributor 87 and from then on it is distributed through the space 88 around the wing edge 80x and above it and through the space 89 below it to provide a vertical lift. Jet motor means (can be also propeller means) 90 are used to provide forward motion. Rudder means 91 is used for directional control. In this particular case the flying saucer vehicle lands upon the landing legs 82 which are moved out of the way when the vehicle is in flight.

Fig. 3 shows a craft similar in construction to the one shown in Figs. 1 and 2 but with a navigator's cabin 81 running transversely the entire length of the circular wing 80.

Fig. 4 is a cross-section through the navigator's cabin 81 taken on the line 4—4 of Fig. 1 showing further details.

The air from the distributor 87 is directed against the inside edge 80x of the circular doughnut-shaped wing 80. A portion of the air thus directed against the edge 80x is passed through the space 88 which is formed by the upper portion of the wing 80 and the distributor 87, while another portion of the air is passed under the wing 80 and the space formed by the distributor 87 and the circular wing. The air passing above the wing 80, in accordance with aerodynamic principles pertaining to standard cross-section airfoils, creates a vacuum while the air passing under the wing creates a pressure. The combined sum of vacuum above the wing and air pressure below it providing a vertical lift. The force or the amount of lift depending upon the size of the prime mover, the diameter of the air rotor or propellers and the rate of revolutions.

*Operation*

Referring more particularly to Figs. 1, 2, 3, 4 and 5 inclusive, it can be seen that the circular wing 80 has an air inlet or opening O which is centrally located in respect to the wing proper. The wing 80 also has a standard airfoil cross-section. In addition, the wing edge 80x faces the inside rim of the air inlet O and is flanked by the air baffle member 80xx. The vertical shaft 84 which is rotated by the reciprocating motor 83 is secured at its upper end to the ring 85 of the air rotor 82. As the air rotor ring 85 rotates at high speed, it sucks in the air from above the cabin 81 and through the upright circular channel 86 delivers it to the air distributors 87.

By means of the air baffle member 80xx the air is directed against the edge 80x of the wing 80. A part of it passes through the space 88 created by the upper portion of the surface of the wing 80 and the air baffle member 80xx creating an aerodynamic vacuum; another part of the air is directed through the space 89 built by the lower surface of the wing 80 and the baffle member 80xx, under the wing to create an aerodynamic pressure.

The sum total of both, aerodynamic vacuum and pressure providing the craft with a vertical lift.

By means of its rudder and ailerons 90x the craft can maneuver sidewise and fly transversely. To further facilitate sidewise movement, a pair of jet motors 90 are provided. The reaction of the jets permitting the craft high transverse motion and high degree of maneuverability. Propellers can be used too to derive the same effect. To land the craft, the landing legs 83 are extended at will by the navigator. They are retracted when the craft is in motion.

Having now described my invention what I claim is:

1. A flying wing fuselage of circular contour comprising a disk-shaped body with a concentric opening, the shape of said wing being aerofoil-like in cross-section; an aviator's cabin located over said opening, a vertical air passage traversing said cabin, a prime-mover means under said wing, a vertical shaft extending from said prime-mover and passing through said cabin, an air suction means located over said cabin, said suction means secured to said vertical shaft and being operated by it; said prime-mover being secured to said wing, the operation of said air suction means by said prime-mover means creating a stream of air to pass through said vertical air passage in said cabin, baffle plate means included to direct the air from said passage against the aerofoil cross-section of said wing to create a vertical lift; landing gear to launch said wing and jet motor means to propel said wing in the air.

2. A flying machine including an aerofoil-shaped disk-like body with a concentric opening therein; said body having a wider section near the opening in the center and a thinner tapering away section near the outer edge of the disk; an aviator's cabin located over said opening, air suction means in said machine and a prime-mover to operate said suction means, a vertical shaft running from said prime-mover to said suction means and means securing said prime-mover to said machine; the operation of said air suction means by said prime-mover creating a stream of air to pass through a vertical passage in said cabin and to strike against the wider section of said body.

3. The same structure as set forth in claim 2: said air suction means including an air rotor, said rotor secured to said upright shaft and being rotated by said shaft.

4. A disk-like saucer-shaped flying wing including a circular body, an opening passing through said body, said body having an aerodynamically aerofoil-like cross-section resembling the standard cross-section through the wing of an aeroplane with a wider section near said opening and a thinner section near the outer rim of said disk; a navigator's cabin over said opening, an air passage leading through said cabin, an air suction means in said passage, a vertical shaft and a prime-mover, said air suction means being secured to said shaft, said prime-mover rotating said shaft to operate said suction means, said suction means creating a stream of air to pass through said passage in said cabin, baffle plate means in said air passage to direct the air against the wider section in said body to create a vertical lift, and jet motor means to drive the flying wing forward.

5. The same structure as set forth in claim 4: and shock absorber means secured to the lower portion of said body to facilitate safe landing and launching as set forth.

6. The same structure as set forth in claim 4: and control devices in said cabin to permit the aviator at will to direct said saucer-shaped flying wing in its flight through the air, said devices being operatively connected to a rudder and aileron for directional and vertical control.

References Cited in the file of this patent

UNITED STATES PATENTS

| D. 162,560 | Miller | Mar. 20, 1951 |
| 1,440,242 | Porter | Dec. 26, 1922 |
| 1,660,257 | Crespo | Feb. 21, 1928 |
| 1,846,125 | La Fon | Feb. 23, 1932 |
| 1,911,041 | Smyser | May 23, 1933 |
| 2,014,051 | Nishi | Sept. 10, 1935 |
| 2,077,471 | Fink | Apr. 20, 1937 |
| 2,377,835 | Weygers | June 6, 1945 |

FOREIGN PATENTS

| 221,790 | Great Britain | Nov. 30, 1925 |
| 406,971 | Great Britain | June 1, 1932 |